(12) United States Patent
He et al.

(10) Patent No.: US 10,115,939 B2
(45) Date of Patent: Oct. 30, 2018

(54) BATTERY COVER PLATE ASSEMBLY AND BATTERY HAVING THE SAME

(71) Applicant: BYD COMPANY LIMITED, Shenzhen (CN)

(72) Inventors: Long He, Shenzhen (CN); Haiquan Wang, Shenzhen (CN); Hong Xiao, Shenzhen (CN); Deding Gou, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 248 days.

(21) Appl. No.: 15/013,831

(22) Filed: Feb. 2, 2016

(65) Prior Publication Data
US 2016/0155999 A1    Jun. 2, 2016

Related U.S. Application Data

(63) Continuation of application No. PCT/CN2014/085062, filed on Aug. 22, 2014.

(30) Foreign Application Priority Data

Aug. 23, 2013  (CN) ............... 2013 2 0517305 U
Aug. 23, 2013  (CN) ............... 2013 2 0517777 U
Aug. 23, 2013  (CN) ............... 2013 2 0517974 U

(51) Int. Cl.
*H01M 2/04*     (2006.01)
*H01M 2/06*     (2006.01)
(Continued)

(52) U.S. Cl.
CPC ........... *H01M 2/0404* (2013.01); *H01M 2/06* (2013.01); *H01M 2/22* (2013.01); *H01M 2/30* (2013.01); *H01M 2220/30* (2013.01)

(58) Field of Classification Search
CPC .. H01M 2220/30; H01M 2/0404; H01M 2/06; H01M 2/22; H01M 2/30
See application file for complete search history.

(56) References Cited

U.S. PATENT DOCUMENTS

2002/0142195 A1 * 10/2002 Ehara ............... H01M 2/0215
                                                          429/7
2005/0266279 A1   12/2005 Kim
(Continued)

FOREIGN PATENT DOCUMENTS

CN    2854818 Y    1/2007
CN    201084788 Y  7/2008
(Continued)

OTHER PUBLICATIONS

BYD Company Limited, International Search Report and Written Opinion, PCT/CN2014/085062, Nov. 26, 2014, 14 pgs.

*Primary Examiner* — Carlos Barcena

(57) ABSTRACT

A battery cover plate assembly and a battery having the same are provided. The battery cover plate includes: a cover plate (1); an insulation sheet (3) comprising an insulation sheet body (30) defining first and second ends (301, 302) and a limitation portion (31) disposed at the second end (302) of the insulation sheet body (30) and defining a limitation space (32) with a lower surface of the insulation sheet body (30); and a negative connection sheet (2) comprising a riveting portion (21) and a negative tab connection portion (22) defining a limitation end (221), in which the riveting portion (21) is connected to the insulation sheet (3) and the cover plate (1) via a rivet (4), and the limitation end (221) is inserted into the limitation space (32).

16 Claims, 6 Drawing Sheets

(51) Int. Cl.
*H01M 2/30* (2006.01)
*H01M 2/22* (2006.01)

(56) References Cited

U.S. PATENT DOCUMENTS

| | | | | |
|---|---|---|---|---|
| 2006/0057459 A1* | 3/2006 | Kwon | ................... | H01M 2/06 429/174 |
| 2011/0318634 A1* | 12/2011 | Uh | ....................... | H01M 2/04 429/178 |

FOREIGN PATENT DOCUMENTS

| | | |
|---|---|---|
| CN | 201364915 Y | 12/2009 |
| CN | 201438481 U | 4/2010 |
| CN | 101783198 A | 7/2010 |
| CN | 202178302 U | 3/2012 |
| CN | 202259469 U | 5/2012 |
| CN | 202549944 U | 11/2012 |
| CN | 203481288 U | 3/2014 |
| CN | 203481289 U | 3/2014 |
| CN | 203574017 U | 4/2014 |
| JP | 2005050609 A | 2/2005 |
| JP | 2010129251 A | 6/2010 |
| WO | WO0011736 A1 | 3/2000 |

\* cited by examiner

BATTERY COVER PLATE ASSEMBLY AND BATTERY HAVING THE SAME

CROSS-REFERENCE TO RELATED APPLICATIONS

This application is a continuation of PCT application No. PCT/CN2014/085062 filed Aug. 22, 2014, which claims priority and benefit of Chinese Patent Application Nos. 201320517974.8, 201320517777.6 and 201320517305.0, all filed with State Intellectual Property Office, P. R. C. on Aug. 23, 2013. The entire contents of the above-identified applications are incorporated herein by reference.

FIELD

The present disclosure relates to a field of battery, especially relates to a battery cover plate assembly and a battery having the same.

BACKGROUND

A battery such as a lithium-ion battery is widely used in different electronic devices. The battery usually includes a shell, a core within the shell and a cover plate assembly configured to seal an opening in the shell. The cover plate assembly includes: a cover plate, a negative connection sheet and an insulation sheet. During the process of riveting the cover plate, the negative connection sheet and the insulation sheet, it is easy for the negative connection sheet to rotate with respect to the cover plate due to an impact force, such that the negative connection sheet is deflected and it is easy for a short circuit to occur. In addition, an end of the negative connection sheet far away from a connection position between the negative connection sheet and the cover plate is easy to deform, such that the end of the negative connection sheet is cocked up.

SUMMARY

Embodiments of the present disclosure seek to solve at least one of the problems existing in the prior art to at least some extent.

Embodiments of a first aspect of the present disclosure provide a battery cover plate assembly. The battery cover plate assembly includes a cover plate; an insulation sheet comprising an insulation sheet body and a limitation portion, the insulation sheet body defining a first end and a second end, the limitation portion being disposed at the second end of the insulation sheet body and defining a limitation space with a lower surface of the insulation sheet body; and a negative connection sheet comprising a riveting portion and a negative tab connection portion configured to connect to a negative tab and defining a limitation end, in which the insulation sheet is disposed between the cover plate and the negative connection sheet, and the riveting portion is connected to the insulation sheet and the cover plate via a rivet, and the limitation end is inserted into the limitation space.

Embodiments of a second aspect of the present disclosure provide a battery. The battery includes: a shell defining an opening; a core and an electrolyte within in the shell; and a battery cover plate assembly provided according to above embodiments of the present disclosure and configured to seal the opening of the shell.

With the battery cover plate assembly and the battery according to embodiments of the present disclosure, during the process of assembling the battery cover plate, the negative connection sheet and the insulation sheet via the rivet, the limitation end of the negative connection sheet can be prevented from being cocked up to effectively reduce a space occupied by the negative connection sheet inside the battery. Therefore, a volume of the battery may be reduced effectively without affecting a safety performance of the battery.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
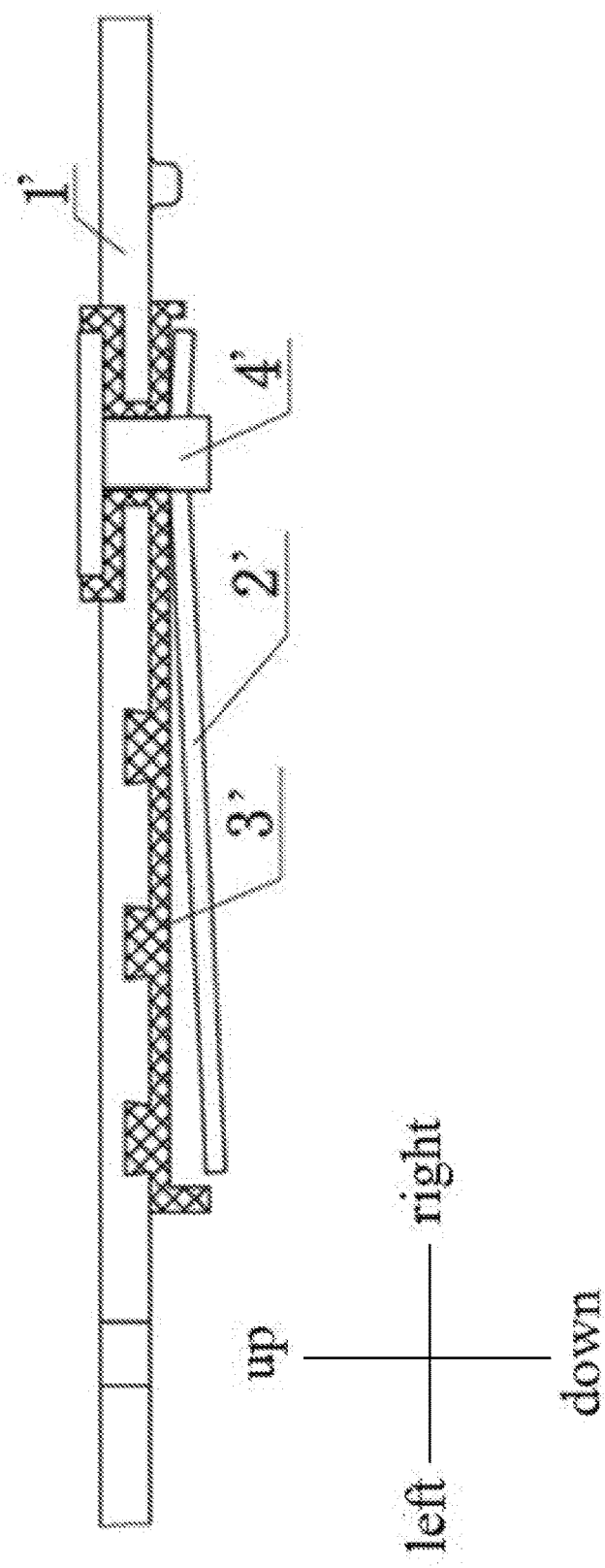
FIG. 1 is a schematic view of a battery cover plate assembly in a related art.

Reference will be made in detail to embodiments of the present disclosure. The same or similar components and the components having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" ,"inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two components. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top" of the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

FIG. 1 is a schematic view of a battery cover plate assembly in a related art.

As shown in FIG. 1, the battery cover plate assembly includes a cover plate 1', a negative connection sheet 2' and an insulation sheet 3' assembled together via a rivet 4', and the insulation sheet 3' is disposed between the cover plate 1' and the negative connection sheet 2'. During a riveting, an end (a left end shown in FIG. 1) of the negative connection sheet 2' is easy to cock up.

Figure 2:
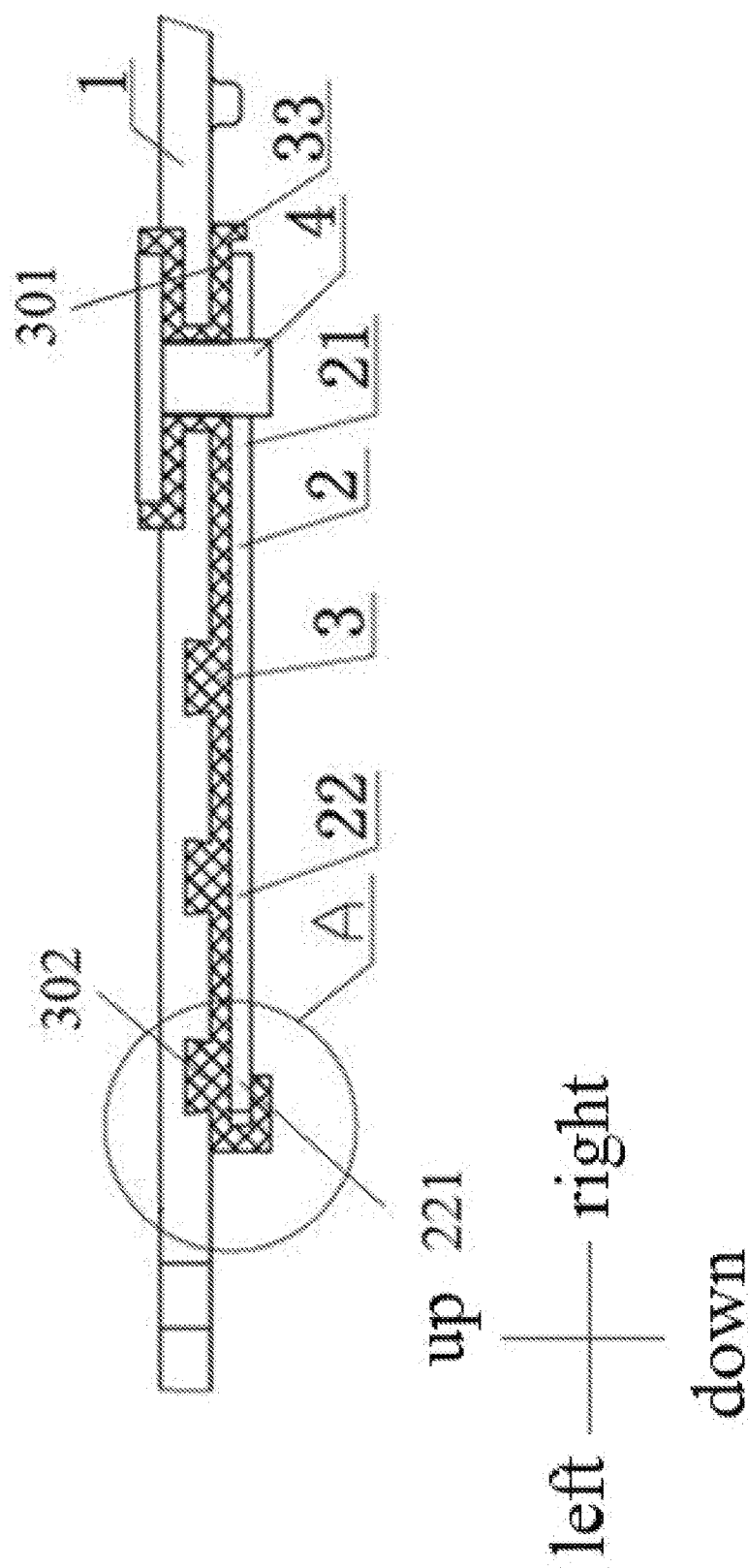
FIG. 2 is a schematic view of a battery cover plate assembly according to an embodiment of the present disclosure.

FIG. 2 is a schematic view of a battery cover plate assembly according to an embodiment of the present disclosure.

As shown in FIG. 2, the power cover plate assembly includes: a cover plate 1, an insulation sheet 3 and a negative connection sheet 2. The insulation sheet 3 includes an insulation sheet body 30 and a limitation portion 31, and the insulation sheet body 31 has a first end 301 and a second end 302, and the limitation portion 31 is disposed at the second end 302 of the insulation sheet body 30 and defines a limitation space 32 with a lower surface of the insulation sheet body 30. Moreover, the negative connection sheet 2 includes a riveting portion 21 and a negative tab connection portion 22, and the negative tab connection portion 22 is configured to connect to a negative tab and has a limitation end 221. The insulation sheet 3 is disposed between the cover plate 1 and the negative connection sheet 2, and the riveting portion 21 is connected to the insulation sheet 3 and the cover plate 1 via a rivet 4, and the limitation end 221 is inserted into the limitation space 32.

Figure 3:
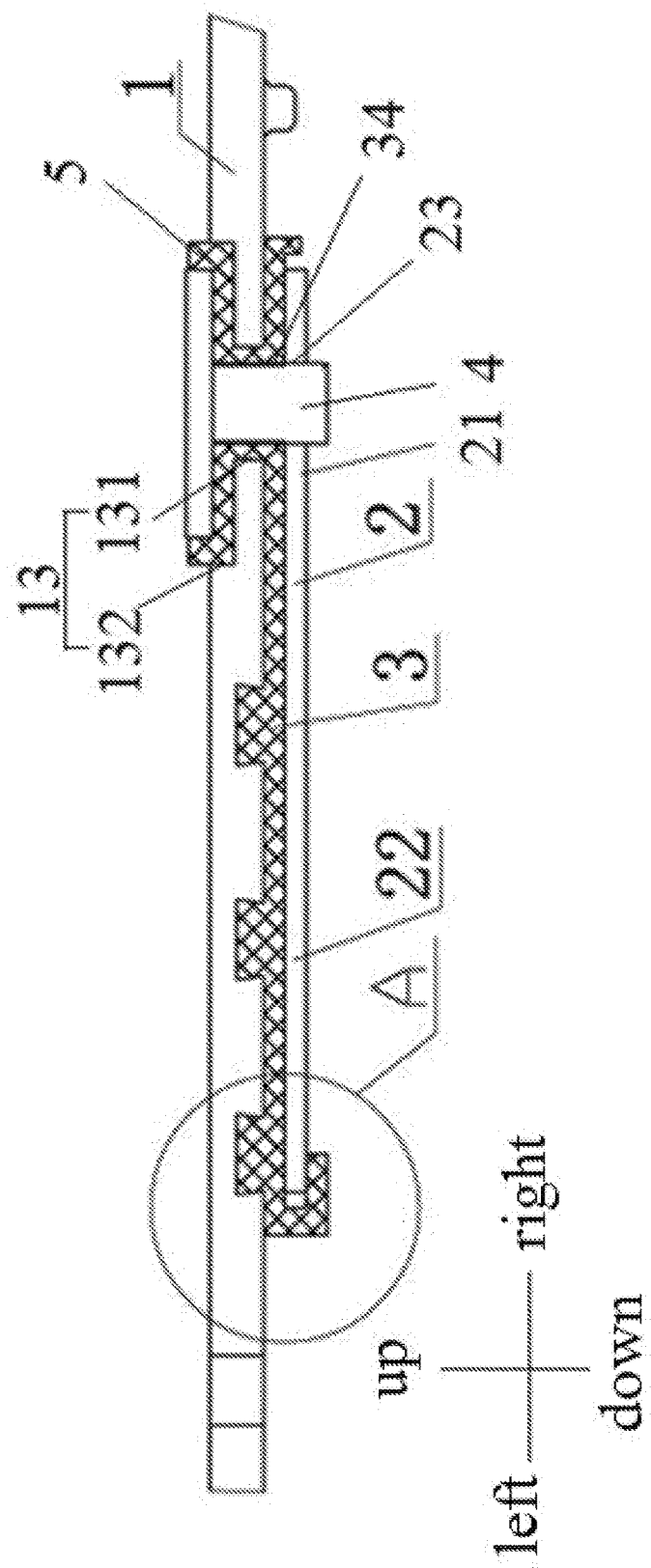
FIG. 3 is a cross-sectional view of a battery cover plate assembly according to an embodiment of the present disclosure.

As shown in FIGS. 2 and 3, the insulation sheet 3 is disposed between the cover plate 1 and the negative connection sheet 2. Specifically, the cover plate 1 is disposed on the insulation sheet 3 and the negative connection sheet 2 is disposed below the insulation sheet 3, such that the cover plate 1 and the negative connection sheet 2 can be insulated from each other by the insulation sheet 3. A shape of the insulation sheet 3 may be identical with or similar to that of the negative connection sheet 2, such that it is convenient for the insulation sheet 3 to match with the negative connection sheet 2 and the negative connection sheet 2 and the cover plate 1 can be well isolated from each other by the insulation sheet 3. In an embodiment of the present disclosure, the insulation sheet 3 may be formed between the cover plate 1 and the negative connection sheet 2, and between the cover plate 1 and the rivet 4, via an injection molding, such that the cover plate 1 and the negative connection sheet 2 may be insulated from each other, and also the cover plate 1 and the rivet 4 may be insulated from each other.

In some embodiments of the present disclosure as shown in FIG. 3, a first through hole 13 is formed in the cover plate 1, and the insulation sheet 3 passes through the first through hole 13 and is extended upwardly to form an insulation layer 5. Also, a second through hole 34 corresponding to the first through hole 13 is formed in the insulation sheet 3, and the rivet 4 passes through the first through hole 13 and the second through hole 34 to connect the cover plate 1 with the insulation sheet 3. In other words, the insulation layer 5 is disposed between the rivet 4 and an inner wall of the first through hole 13, and the insulation layer 5 is integrally formed with the insulation sheet 3. In addition, a third through hole 23 is formed in the negative connection sheet 2, and the rivet 4 passes through the third through hole 23 to connect the negative connection sheet 3 with the cover plate 1 and the insulation sheet 3. Alternatively, a bottom of the rivet 4 is welded to the negative connection sheet 2.

In embodiments of the present disclosure, during the process of manufacturing the battery cover plate assembly, the cover plate 1 formed with the first through hole 13 is prepared firstly, in which the first through hole 13 includes a lower hole segment 131 and an upper hole segment 132 having a radial dimension larger than that of the lower hole segment 131. Then, the insulation sheet 3 is formed on the cover plate 1 via the injection molding. Therefore, the second through hole 34 corresponding to the first through hole 13 is formed in the insulation sheet 3, and the rivet 4 passes through the first through hole 13 and the second through hole 34 to connect to the negative connection sheet 2.

It should be noted that the first through hole 13, the second through hole 34 and the third through hole 23 are known to those skilled in the art. There are no limitations on a size of the first, second and third through holes, they may be designed according to an actual need, and thus detailed descriptions thereof are omitted herein.

In an embodiment of the present disclosure as shown in FIGS. 2 and 3, a blind hole (not shown) is formed in a lower surface (opposite to an upper surface of the insulation sheet 3) of the cover plate 1. When the insulation sheet 3 is formed by the injection molding, a part of the insulation sheet 3 at a position corresponding to the blind hole may be molded into the blind hole. After being cooled, the insulation sheet 3 can be coupled with the cover plate 1 tightly. It should be noted that there may be one or more blind holes, a number of the blind holes may be determined according to a size of the insulation sheet 3.

In some embodiments of the present disclosure as shown in FIGS. 2 and 3, the negative connection sheet 2 includes the riveting portion 21, and the riveting portion 21 is located adjacent to the first end 301 of the insulation sheet body 31. The rivet 4 passes through the first through hole 13 and the second through hole 34 to connect to the riveting portion 21. That is, the riveting portion 21 is connected to the insulation sheet 3 via the rivet 4. Furthermore, the third through hole 23 as stated above is formed in the riveting portion 21, and the rivet 4 passes through the first through hole 13, the second through hole 34 and the third through hole 23 in the riveting portion 21 to connect the cover plate 1, the insulation sheet 3 and the negative connection sheet 2 together.

In some embodiments of the present disclosure, the negative connection sheet 2 includes the negative tab connection portion 22, and the negative tab connection portion 22 is located adjacent to the second end 302 of the insulation sheet body 31. In other words, the riveting portion 21 is disposed at one end of the negative connection sheet 2 and the negative tab connection portion 22 is disposed at the other end of the negative connection sheet 2. The negative tab connection portion 22 is configured to connect to a negative tab. In general, the negative tab is welded on the negative tab connection portion 22 to output a current. In an embodiment of the present disclosure as shown in FIG. 2, the negative connection sheet 3 is integrally formed, and the negative tab connection portion 22 is actually a left end of the negative connection sheet 2. Certainly, in other embodiments of the present disclosure, the negative connection sheet 2 may have other structures such as a separable structure, and the negative tab connection portion 22 may be an additional component individually fixed at an end of the negative connection sheet 2. All of these fall in the protection scope of the present disclosure.

Figure 4:
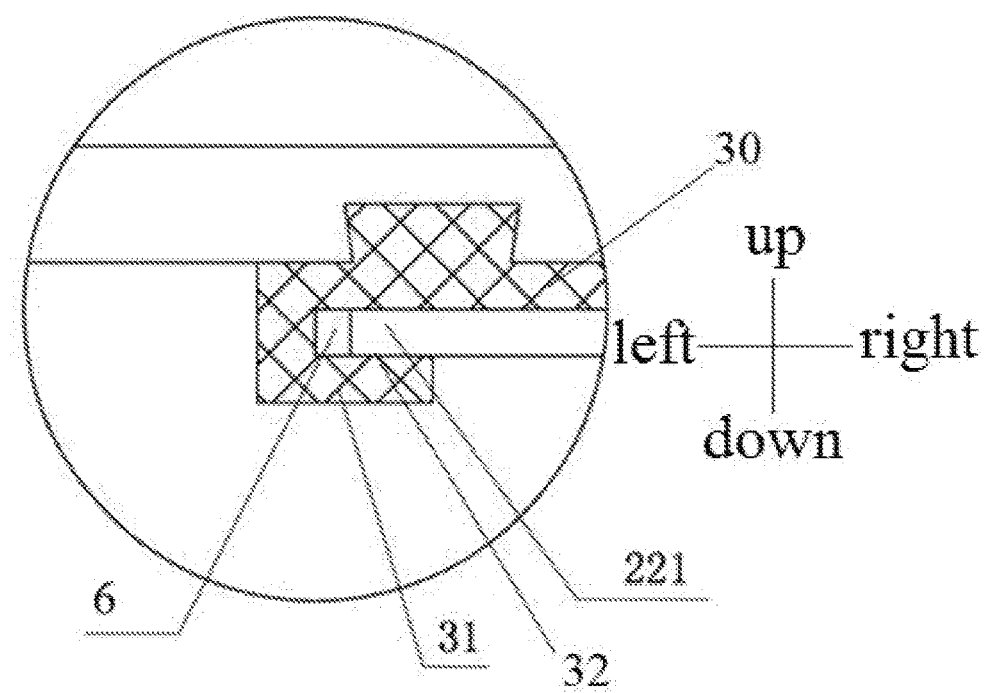
FIG. 4 is an enlarged view of part A in FIG. 2.

In a further embodiment of the present disclosure as shown in FIG. 4, the negative tab connection portion 22 has the limitation end 221. The insulation sheet 3 includes the limitation portion 31 which is disposed at the second end 302 of the insulation sheet body 30 and defines the limitation space 32 with the lower surface of the insulation sheet body 30. The limitation end 221 is inserted into the limitation space 32, such that an end (i.e., a left end of the negative connection sheet 2 shown in FIG. 4) of the negative connection sheet 2 adjacent to the second end 302 of the insulation sheet body 30 is prevented from being cocked up. When the negative connection sheet 2 is to be assembled, the limitation end 221 of the negative tab connection portion 22 of the negative connection sheet 2 is inserted into the limitation space 32 firstly, and then the negative connection sheet 2 is connected to the insulation sheet 3 via the rivet 4 at the position adjacent to the second end 302 of the insulation sheet body 30. Since the limitation end 221 is restrained in the limitation space 32, the limitation end 221 of the negative tab connection portion 22 of the negative connection sheet 2 will not be cocked up due to a force acted on the riveting portion 21 during the riveting. As shown in FIGS. 2 and 4, the limitation end 221 is the left end of the negative tab connection portion 22 of the negative connection sheet 2.

As shown in FIG. 4, the limitation space 32 has a U-shape opened in a direction from the second end 302 of the insulation sheet body 30 toward the first end 301 of the insulation sheet body 30, such that it is convenient for the negative connection sheet 2 to insert into the limitation space 32, and it is easy to form the limitation space 32. Certainly, grooves of different shapes are possible, and there are no particular limitations on the shape of the limitation space 32.

Figure 5:
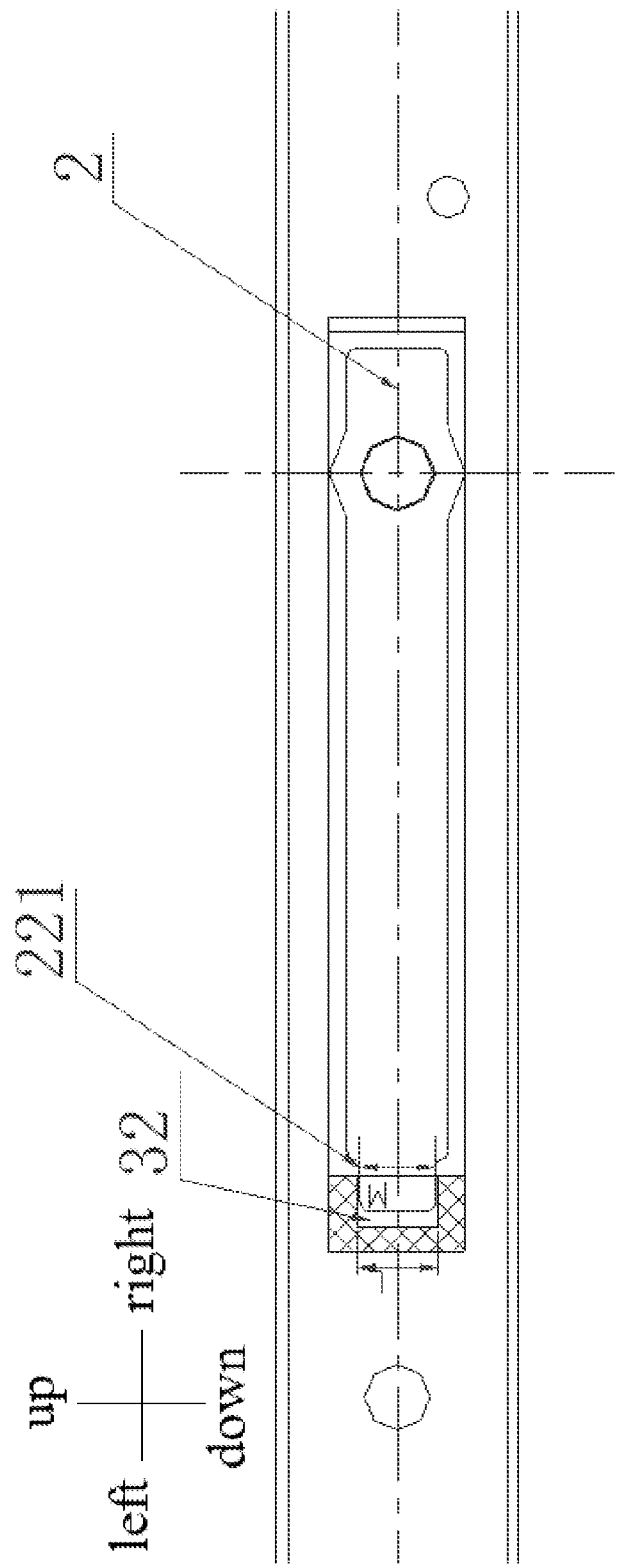
FIG. 5 is a bottom view of a battery cover plate assembly according to an embodiment of the present disclosure.

In an embodiment of the present disclosure as shown in FIG. 5, a width L of the limitation space 32 is greater than a width M of the limitation end 221, such that it is much easier for the limitation end 221 to insert into the limitation space 32 and to dispose therein. It should be noted that a width direction of each of the limitation space 32 and the limitation end 221 is a direction corresponding to a thickness of the battery. In an embodiment of the present disclosure, the battery may be a lithium-ion battery. Since the width L of the limitation space 32 is greater than the width M of the limitation end 221, the limitation end 221 can be held within the limitation portion 31 completely, such that the limitation end 221 can be restrained within the limitation space 32 totally during the riveting. Otherwise, when the width L of the limitation space 32 is smaller than that of the limitation end 221, although the limitation end 221 may be prevented from being cocked up, a side edge of the negative tab connection portion 22 may be cocked up due to a great force or a relatively soft material of the negative connection sheet 2, thus occupying an inner space of the lithium-ion battery.

Furthermore, a lateral wall 33 is disposed at the first end 301 of the insulation sheet body 30 and extended downwardly, and the negative connection sheet 2 is disposed at an internal side of the lateral wall 33, such that the negative connection sheet 2 can be prevented from being deflected and the right end of the negative connection sheet 2 can be prevented from being cocked up during the riveting.

In an embodiment of the present disclosure, the limitation end 221 includes a chamfer (not shown), and thus it is easier for the limitation end 221 to insert into the limitation space 32, such that the limitation end 221 can be fitted well within the limitation space 32.

In embodiments of the present disclosure, the limitation portion 31 may be an additional component individually disposed on a lower surface of the second end 302 of the insulation sheet body 30. Alternatively, the limitation portion 31 may be formed by bending the second end 302 of the insulation sheet body 30, thus reducing working procedure and providing an easy operation.

In an embodiment of the present disclosure, a height of the limitation space 32 is larger than a thickness of the limitation end 221 by 0.05 mm to 0.2 mm. In theory, the smaller the height of the limitation space 32 is, the better a limitation effect is. However, considering a simple operation, the height of the limitation space 32 may be slightly greater than the thickness of the limitation end 221. For example, in an embodiment of the present disclosure, the height of the limitation space 32 is greater than the thickness of the limitation end 221 by 0.1 mm.

As shown in FIG. 4, in an embodiment of the present disclosure, in order to install the negative connection sheet 2 easily, a buffering gap 6 is formed between an end surface of the limitation end 221 and a wall of the limitation space 32. Therefore, the limitation portion 31 can be prevented from being broken due to a great riveting force during the process of assembling the batter cover plate assembly.

In theory, the limitation end 221 may be inserted into the limitation space 32 and contact with a leftmost end of the limitation space 32, such that the limitation end 221 can be prevented from waggling in the limitation space 32. However, since the technology cannot reach an ideal condition, and a certain buffering space is needed for a riveting process, the buffering gap 6 is required to be formed between the limitation end 221 and the leftmost end of the limitation space 32.

In an embodiment of the present disclosure, a length of the buffering gap 6 in a left-right direction is 0.3 mm to 0.5 mm. As shown in FIG. 4, the length of the buffering gap 6 is a distance from the end surface of the limitation end 221 to the leftmost end of the limitation space 32.

It should be noted that the length of the buffering gap 6 may be adjusted according the actual need. For example, when the battery is used in a cell phone, that is, the battery has a small size, the negative connection sheet 2 may be relatively small, and then the length of the buffering gap 6 is small; while when the battery has a big size, the negative connection sheet 2 may be relatively big, and an error in operating may be great, and therefore the length of the required buffering gap 6 is big, i.e., the length of the buffering gap 6 is increased.

In applications of the related art, the end of the riveted negative connection sheet 2 adjacent to the second end 302 of the insulation sheet body 30 will be cocked up greatly, a deformation angle thereof may be 3° to about 5°. However, with the battery cover plate assembly according to embodiments of the present disclosure, by providing the limitation portion 31 and setting the height of the limitation space 32 to be greater than the thickness of the limitation end 221 by about 0.05 mm to about 0.2 mm, the limitation end 221 may be cocked up by 0.2 mm at most during the riveting, such that the deformation angle can be greatly reduced. Certainly, when the height of the limitation space 32 is greater than the thickness of the limitation end 221 by 0.05 mm, more space in an up-down direction can be saved.

Figure 6:
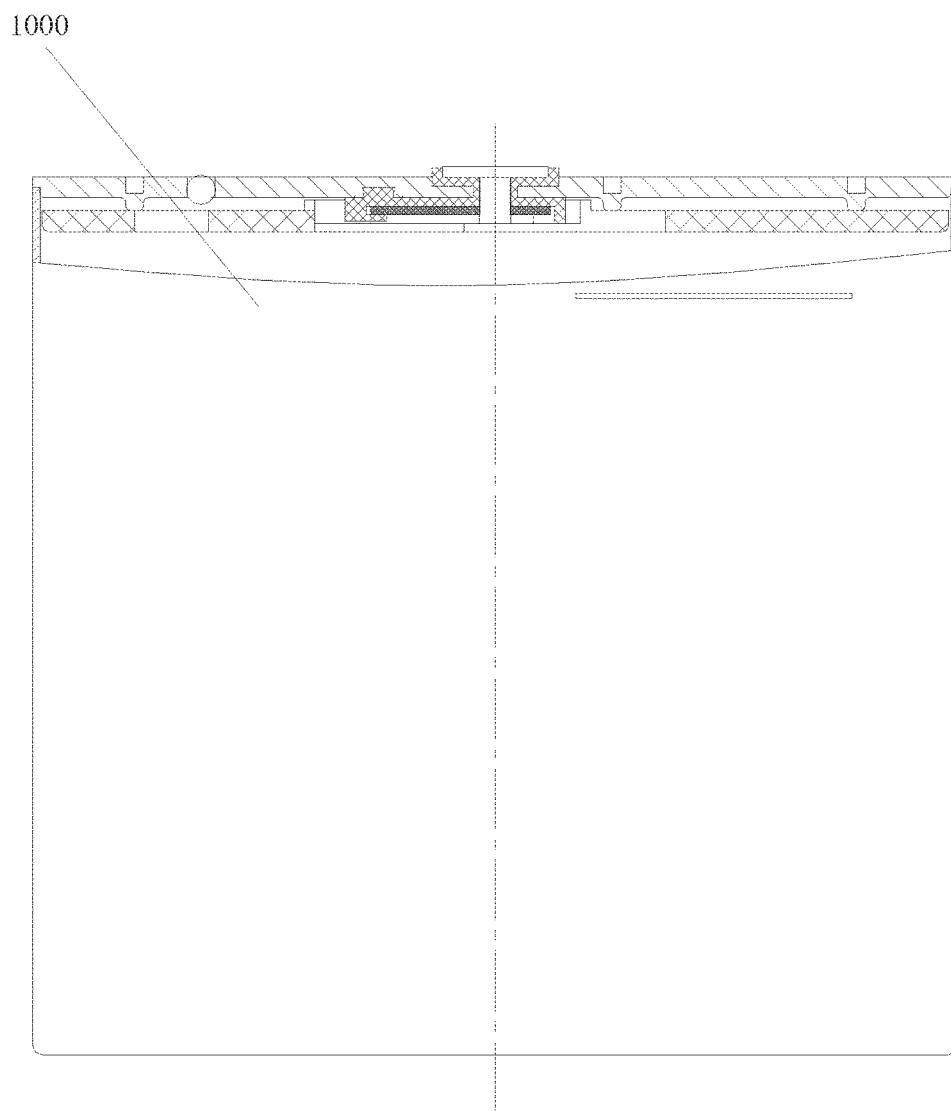
FIG. 6 is a schematic view of a battery according to an embodiment of the present disclosure.

Embodiments of the present disclosure also provide a battery 1000. As shown in FIG. 6, the battery 1000 includes: a shell, a core and an electrolyte, and a battery cover plate assembly. The shell defines an opening, and the core and the electrolyte are disposed within in the shell and the battery cover plate assembly is a battery cover plate provided according to above embodiments of the present disclosure and is configured to seal the opening of the shell.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A battery cover plate assembly, comprising:
a cover plate;
an insulation sheet comprising an insulation sheet body and a limitation portion, the insulation sheet body defining a first end and a second end, the limitation portion being disposed at the second end of the insulation sheet body and defining a limitation space with a lower surface of the insulation sheet body; and
a negative connection sheet comprising a riveting portion and a negative tab connection portion configured to connect to a negative tab and defining a limitation end, wherein the insulation sheet is disposed between the cover plate and the negative connection sheet, and the riveting portion is connected to the insulation sheet and the cover plate via a rivet, and the limitation end is inserted into the limitation space; and wherein the limitation space has a U-shape opened in a direction from the second end of the insulation sheet body toward the first end of the insulation sheet body, and
wherein a buffering gap is formed within the U-shape of the limitation space, and the buffering gap is between an end of the limitation end and an end of the limitation space.

2. The battery cover plate assembly according to claim 1, wherein a lateral wall is disposed at the first end of the insulation sheet body and extended downwardly, and the negative connection sheet is disposed at an internal side of the lateral wall.

3. The battery cover plate assembly according to claim 1, wherein the limitation portion is integrally formed by bending the second end of the insulation sheet body.

4. The battery cover plate assembly according to claim 1, wherein a height of the limitation space is larger than a thickness of the limitation end by 0.05 mm to 0.2 mm.

5. The battery cover plate assembly according to claim 1, wherein a width of the limitation space is greater than that of the limitation end.

6. The battery cover plate assembly according to claim 1, wherein a length of the buffering gap in a left-right direction is 0.3 mm to 0.5 mm.

7. The battery cover plate assembly according to claim 1, wherein a first through hole is formed in the cover plate, a second through hole is formed in the insulation sheet, a third through hole is formed in the negative connection sheet, and the rivet passes through the first to third through holes.

8. The battery cover plate assembly according to claim 7, wherein an insulation layer is disposed between the rivet and an inner wall of the first through hole.

9. The battery cover plate assembly according to claim 8, wherein the insulation layer and the insulation sheet are formed integrally.

10. The battery cover plate assembly according to claim 7, wherein the first through hole comprise a lower hole segment and an upper hole segment having a radial dimension larger than that of the lower hole segment.

11. The battery cover plate assembly according to claim 1, wherein the insulation sheet is disposed on the cover plate via an injection molding.

12. A battery, comprising.
a shell defining an opening;
a core and an electrolyte within the shell; and
a battery cover plate assembly configured to seal the opening of the shell, the battery cover plate assembly further comprising:
a cover plate;
an insulation sheet comprising an insulation sheet body and a limitation portion, the insulation sheet body defining a first end and a second end, the limitation portion being disposed at the second end of the insulation sheet body and defining a limitation space with a lower surface of the insulation sheet body; and
a negative connection sheet comprising a riveting portion and a negative tab connection portion configured to connect to a negative tab and defining a limitation end,
wherein the insulation sheet is disposed between the cover plate and the negative connection sheet, and the riveting portion is connected to the insulation sheet and the cover plate via a rivet, and the limitation end is inserted into the limitation space; and wherein the limitation space has a U-shape opened in a direction from the second end of the insulation sheet body toward the first end of the insulation sheet body, and wherein a buffering gap is formed within the U-shape of the limitation space, and the buffering gap is between an end of the limitation end and an end of the limitation space.

13. The battery according to claim 12, wherein a lateral wall is disposed at the first end of the insulation sheet body and extended downwardly, and the negative connection sheet is disposed at an internal side of the lateral wall.

14. The battery according to claim 12, wherein the limitation portion is integrally formed by bending the second end of the insulation sheet body.

15. The battery according to claim 12, wherein a width of the limitation space is greater than that of the limitation end.

16. The battery according to claim 12, wherein a first through hole is formed in the cover plate, a second through hole is formed in the insulation sheet, a third through hole is formed in the negative connection sheet, and the rivet passes through the first to third through holes.

\* \* \* \* \*